United States Patent
Wang

(10) Patent No.: US 6,896,840 B2
(45) Date of Patent: May 24, 2005

(54) PROTECTIVE STRAP AND METHOD OF MANUFACTURING THE SAME

(76) Inventor: Jack Wang, No. 168-6, Hai Pin Rd., Ching Shui Chen, Taichung Hsien (TW)

(*) Notice: Subject to any disclaimer, the term of this patent is extended or adjusted under 35 U.S.C. 154(b) by 90 days.

(21) Appl. No.: 10/430,328

(22) Filed: May 7, 2003

(65) Prior Publication Data
US 2004/0221427 A1 Nov. 11, 2004

(51) Int. Cl.[7] ............................................. B29C 43/20
(52) U.S. Cl. ..................... 264/486; 156/242; 264/489; 264/491; 264/132; 264/320
(58) Field of Search ............................... 264/405, 489, 264/491, 320, 325, 132, 293, 486, 322; 156/60, 242, 243

(56) References Cited
U.S. PATENT DOCUMENTS
1,813,390 A * 7/1931 Dwyer ........................ 427/171

5,116,562 A * 5/1992 Lang .......................... 264/132

* cited by examiner

Primary Examiner—Mathieu D. Vargot
(74) Attorney, Agent, or Firm—Browdy and Neimark, P.L.L.C.

(57) ABSTRACT

The present invention provides a protective strap and the method of manufacturing the same. The method includes the steps of providing an elongated strap-like base layer; printing a predetermined drawing on a surface of the base layer, wherein the drawing is formed of a plurality of color bits having a color different from that of the base layer; heating and pressurizing the color bits of the base layer at the same time to enable the base layer to form a plurality of concavities on its surface, wherein each of the color bits is positioned in one of the concavities.

7 Claims, 3 Drawing Sheets

PROTECTIVE STRAP AND METHOD OF MANUFACTURING THE SAME

BACKGROUND OF THE INVENTION

1. Field of the Invention

The present invention relates generally to sporting equipment, and more particularly to a protective strap and the method of manufacturing the same.

2. Description of the Related Art

As shown in FIG. 1, a conventional protective strap 90 adapted to wind around a sporting apparatus is composed of a base layer 92 having a plurality of through holes 94, and an underlayer 96 having a color different from that of the base layer 92 and adhered to an underside of the base layer 92. While the strap 90 is wound around a handle of the sporting apparatus, the underlayer 96 is exposed to show its color and extra frictions will be provided to the user who holds the strap on the handle of the sporting apparatus by means of the through holes 94 of the base layer 92.

However, the through holes 94 of the base layer 92 is structurally destructive to the strap 90, thereby causing the strap 90 to rupture easily from the through holes 94 while holding the strap 90 for a long time.

SUMMARY OF THE INVENTION

The primary objective of the present invention is to provide a protective strap, which is not subject to rupture and is effective esthetically, and a method of manufacturing the protective strap.

The foregoing objective of the present invention is attained by the protective strap of the present invention and the method of manufacturing the same. The method includes the steps of providing an elongated strap-like base layer; printing a predetermined drawing on a surface of the base layer, wherein the drawing is formed of a plurality of color bits having a color different from that of the base layer; heating and pressurizing the color bits of the base layer at the same time to enable the base layer to form a plurality of concavities on its surface, wherein each of the color bits is positioned in one of the concavities.

DETAILED DESCRIPTION OF THE INVENTION

Figure 1:
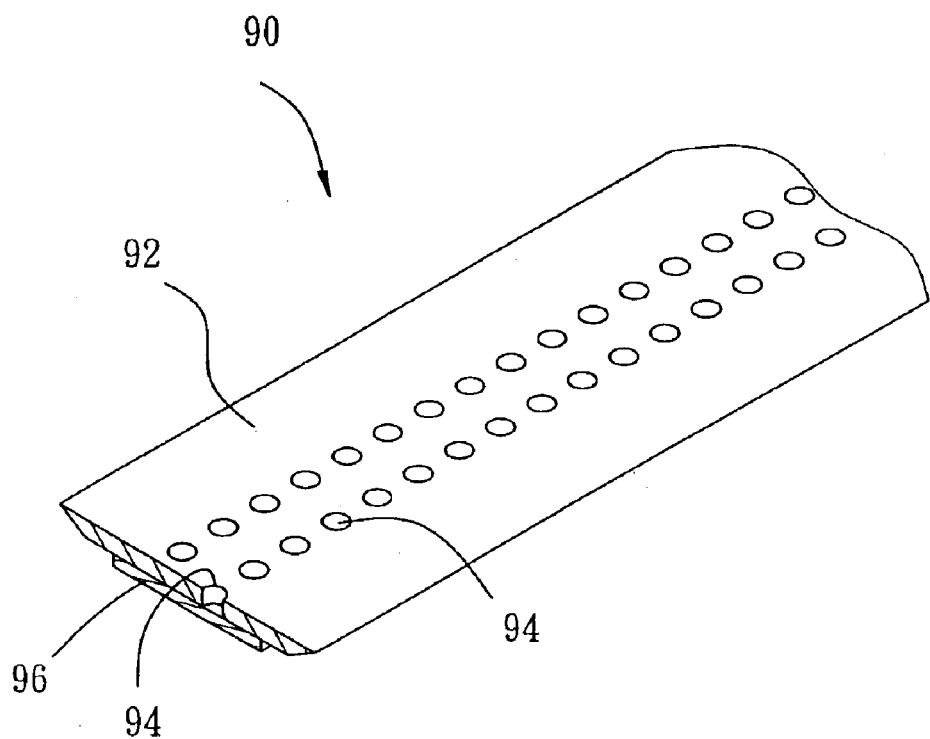
FIG. 1 is a perspective view of a prior art.
Figure 2:
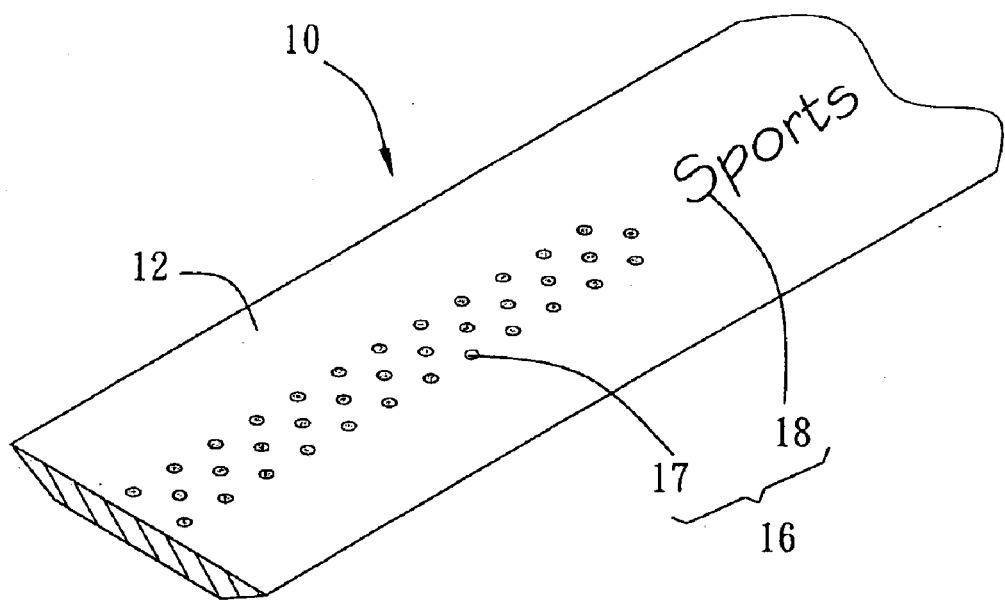
FIG. 2 shows the second step of a method of manufacturing a protective strap in accordance with a first preferred embodiment of the present invention.
Figure 3:
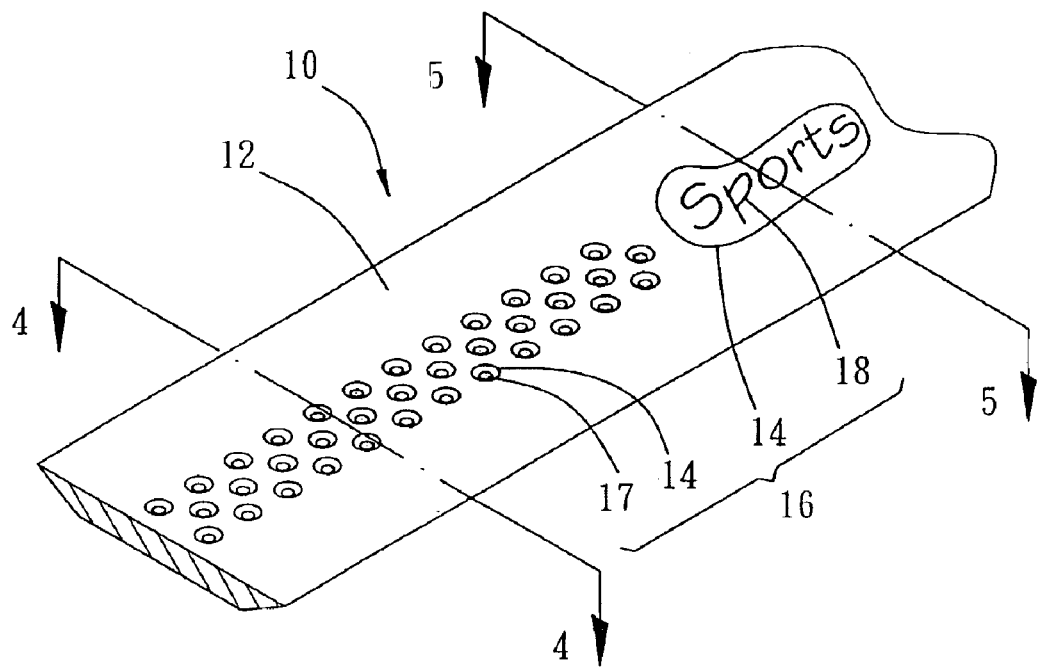
FIG. 3 shows the third step of the method of manufacturing the protective strap in accordance with the first preferred embodiment of the present invention.

Referring to FIGS. 2–3, a method of manufacturing a protective strap 10 according to a first preferred embodiment of the present invention includes the steps as follows:

Step 1: Provide an Elongated Base Layer.

Provide an elongated strap-like base layer 12, which has an outer surface made of polyurethane (PU) in black color. Place the base layer 12 on a smooth surface and allow the outer surface of the base layer 12 to face upwards.

Step 2: Print a Drawing on the Outer Surface of the Base Layer.

As shown in FIG. 2, print a predetermined drawing 16 on the outer surface of the base layer 12. The drawing 16 is formed of a plurality of circular color bits 17 and text color bits 18, such as label or product name, and is white in color.

Step 3: Form Concavities.

Use a mold equipped with a high-frequency wave equipment (not shown) to touch the drawing 16 on the outer surface of the base layer 12 in a short time to heat and pressurize the outer surface of the base layer 12 quickly, thereby forming a plurality of concavities 14 at the drawing 16 on the outer surface of the base layer 12.

Figure 4:
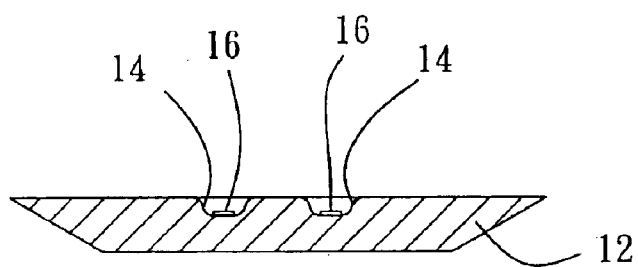
FIG. 4 is a sectional view taken along a line 4—4 indicated in FIG. 3.
Figure 5:
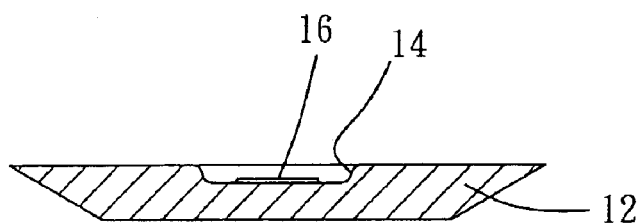
FIG. 5 is a sectional view taken along a line 5—5 indicated in FIG. 3.

Referring to FIGS. 3–5, the protective strap 10 constructed according to the first preferred embodiment of the present invention is composed of the elongated strap-like base layer 12 having the black PU outer surface, the concavities 14 on the outer surface, and the drawing 16 printed in the concavities 14. The drawing 16 includes a plurality of circular color bits 17 and text color bits 18 arranged regularly in the concavities 14. The concavities 14 in which the circular color bits 17 are printed are shaped correspond to the circular color bits 17 positioned in the range of the concavities 14. The concavities 14 in which the text color bits 18 are printed are shaped correspond to the text color bits 18 positioned in the range of the concavities 14, wherein the concavities 14 are slightly larger than the text color bits 18 in range, thereby preventing the drawing 16 from shed off the outer surface of the base layer 12 due to friction generated by holding.

Accordingly, the concavities 14 and the drawing 16 prevent the protective strap 10 of the first preferred embodiment of the present invention from structural destruction and rupture so as to be esthetically effective and to enhance the friction for holding.

Figure 6:
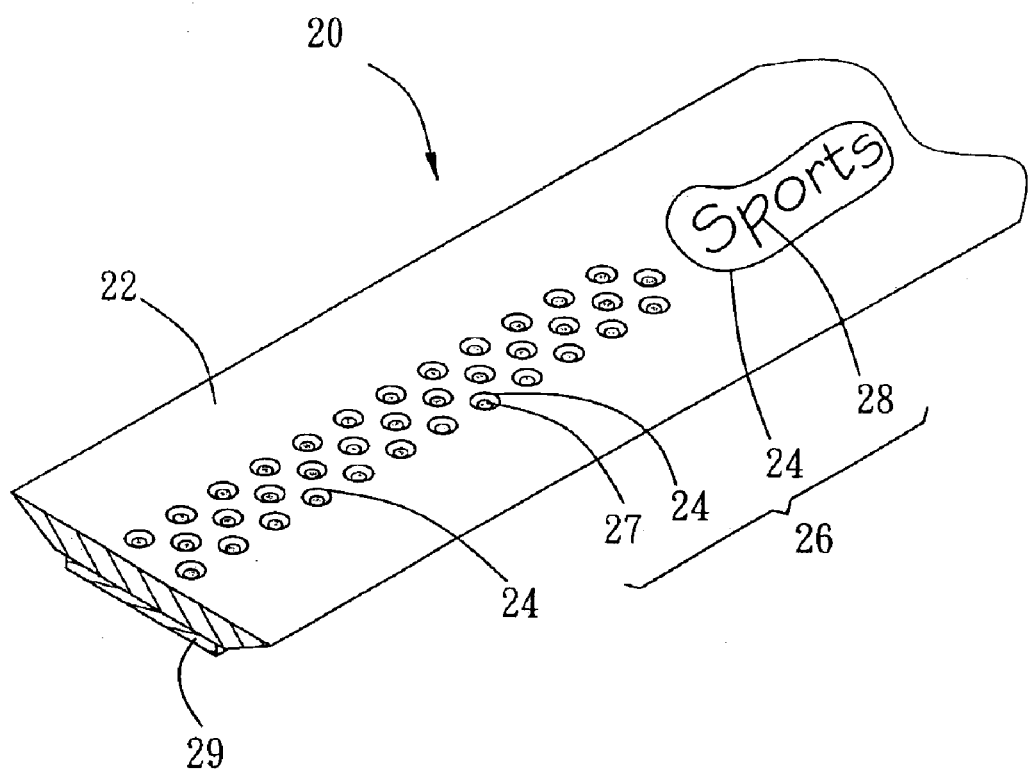
FIG. 6 is a perspective view of another protective strap in accordance with a second preferred embodiment of the present invention.

As shown in FIG. 6, another protective strap 20 according to a second preferred embodiment of the present invention is provided. The method of making the protective strap 20 includes the steps as follows:

Step 1: Provide an Elongated Base Layer.

Provide an elongated strap-like base layer 22, which has an outer surface made of black polyurethane (PU). Place the base layer 22 on a smooth surface and allow the outer surface of the base layer 22 to face upwards.

Step 2: Print a Drawing on the Surface of the Base Layer.

Print a predetermined white drawing 26 on the outer surface of the base layer 22. The drawing 26 is formed of a plurality of circular color bits 27 and text color bits 28.

Step 3: Form Concavities.

Use a mold equipped with a high-frequency wave equipment to touch the drawing 26 on the outer surface of the base layer 22 in a short time for heating and pressurizing the outer surface of the base layer 22 quickly, thereby forming a plurality of concavities 24 at the drawing 26 on the outer surface of the base layer 22.

Step 4: Adhere an Underlayer.

Adhere an elongated strap-like underlayer 29 to an underside of the base layer 22.

As shown in FIG. 6, the protective strap 20 constructed according to the second preferred embodiment of the present invention is composed of the elongated strap-like base layer 22 having the black PU outer surface, the concavities 24 formed on the outer surface thereof, the drawing 26 printed in the concavities 24, and the elongated strap-like underlayer 29 adhered to the underside of the base layer 22. The underlayer 29 is made of a compressible material, thereby enhancing the shock-absorption and the compressibility for holding the protective strap 20.

What is claimed is:

1. A method of manufacturing a protective strap comprising the steps of:
   (a) providing an elongated base layer;
   (b) printing a predetermined drawing on a surface of said base layer, said drawing being formed of a plurality of color bits and having a color different from that of said base layer;
   (c) heating and pressurizing said drawing to form a plurality of concavities on the surface of said base layer, each of said color bits of said drawing being positioned in one of said concavities.

2. The method as defined in claim 1, wherein said color bits in said step (b) are circular.

3. The method as defined in claim 1, wherein said color bits in said step (b) are text.

4. The method as defined in claim 1, wherein said step (c) is performed by a mold equipped with a high-frequency wave equipment.

5. The method as defined in claim 1 further comprising a step of adhering an elongated underlayer to an underside of said base layer after said step (c).

6. The protective strap as defined in claim 1, wherein the elongated base layer is formed as a strap.

7. The protective strap as defined in claim 5, wherein the underlayer is formed as a strap.

* * * * *